FIG. I

INVENTORS
DOUGLAS R.M. LAMBERT
JOSEPH M. SHARKEY
ATTORNEYS

FIG. 2
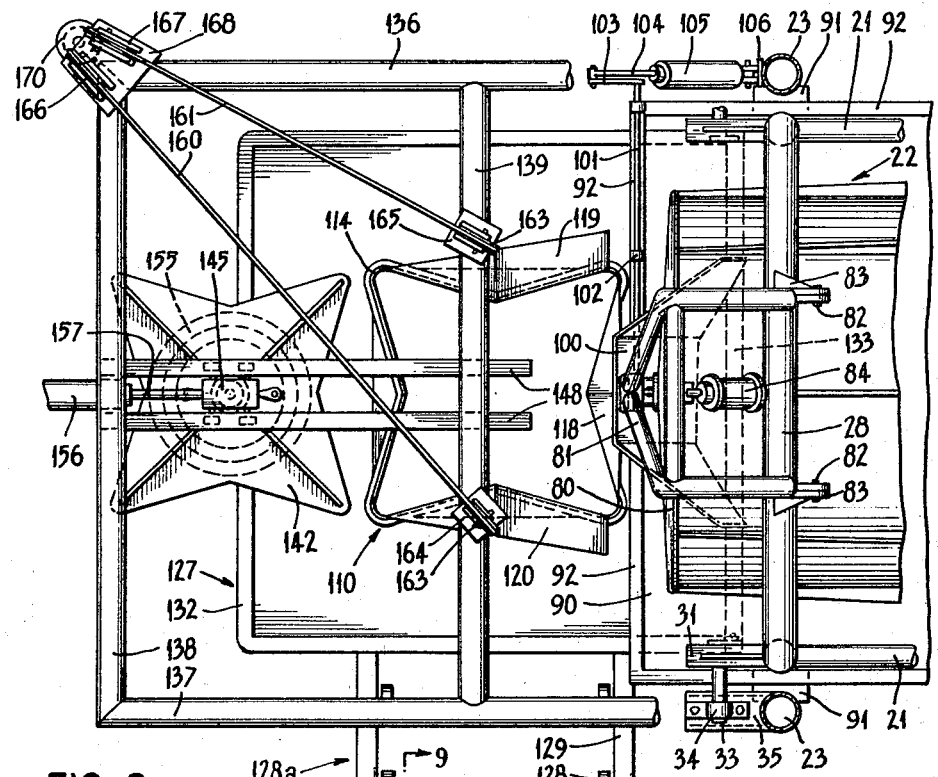
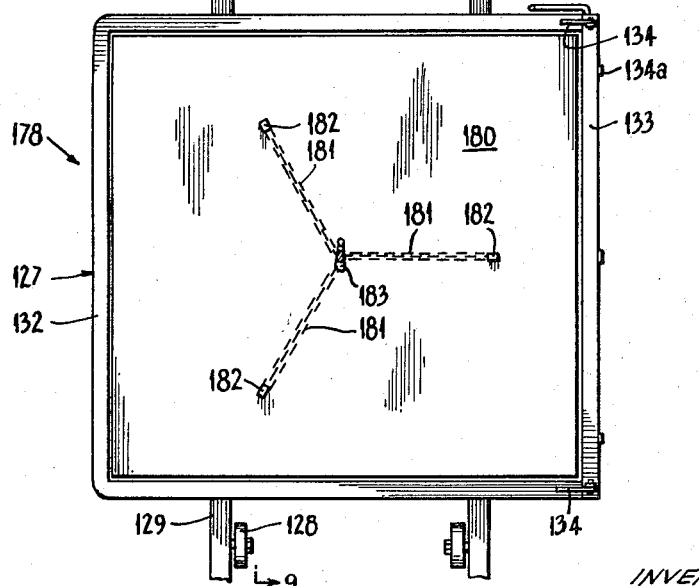
INVENTORS
DOUGLAS R.M. LAMBERT
JOSEPH M. SHARKEY
BY Anderson, Luedeka, Fitch, Even & Tabin
ATTORNEYS

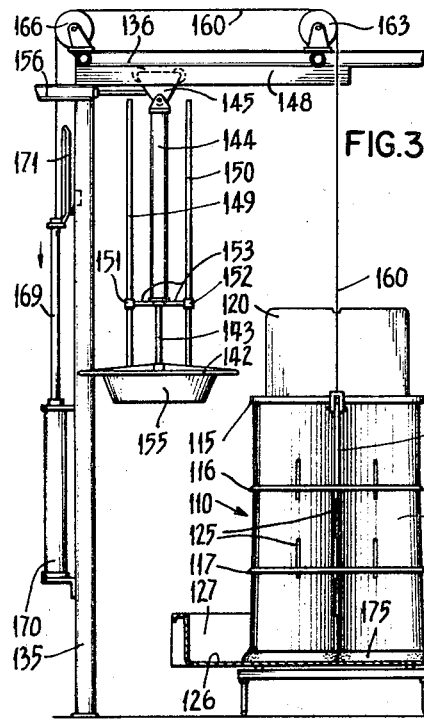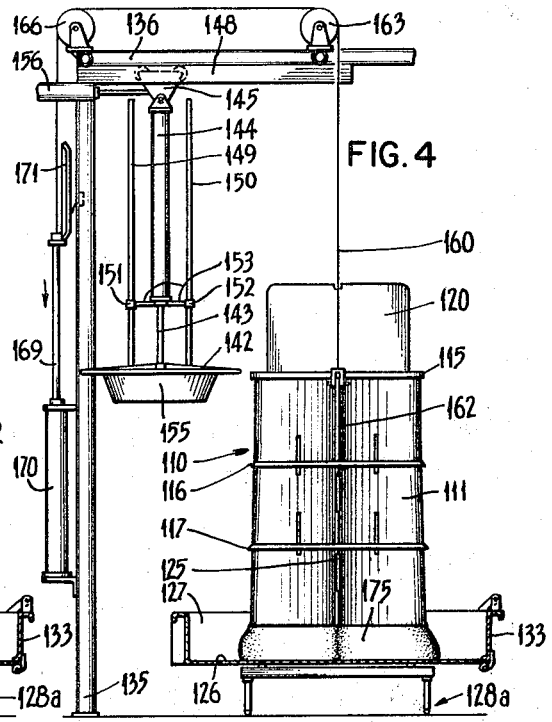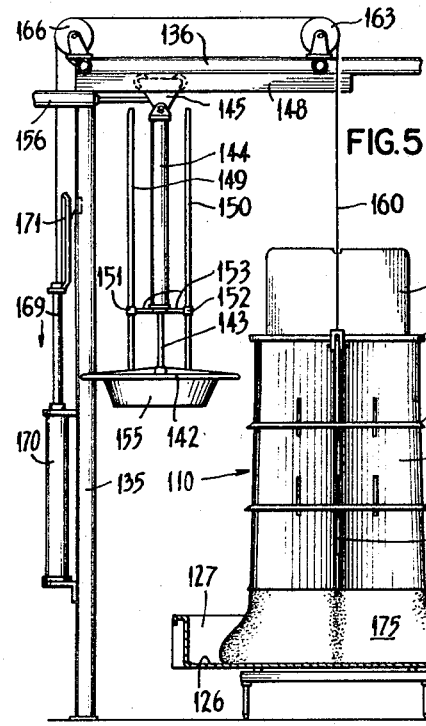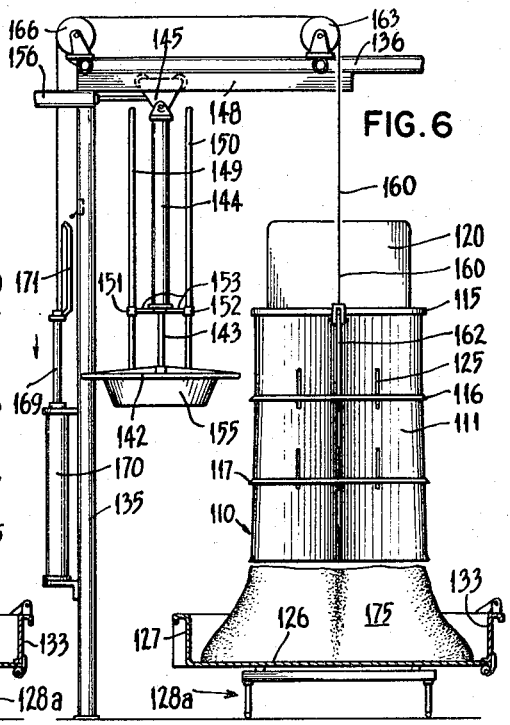

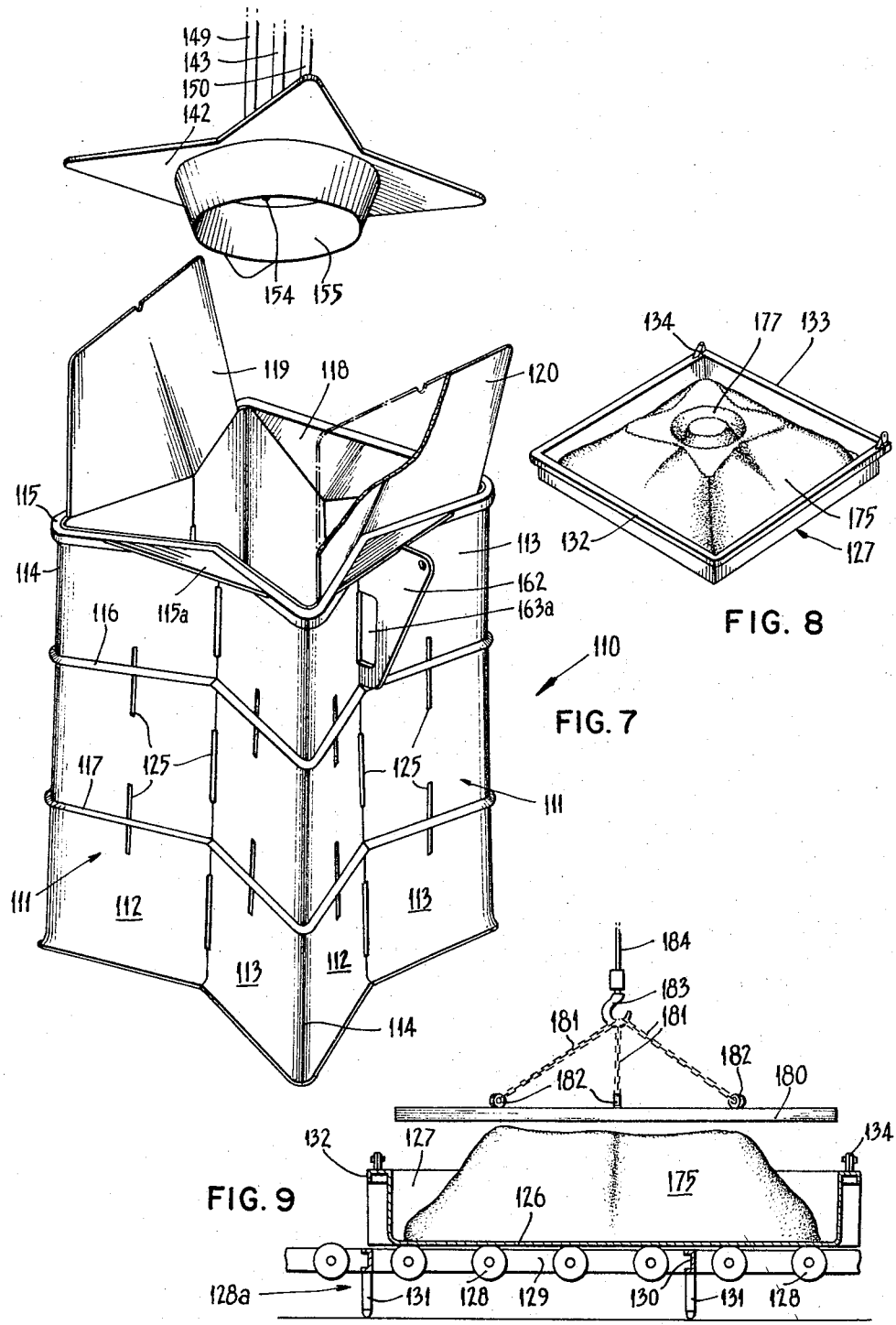

United States Patent Office 3,404,009
Patented Oct. 1, 1968

3,404,009
METHOD OF AND APPARATUS FOR CONDITIONING CHEESE CURD
Douglas R. M. Lambert, Caulfield, Victoria, and Joseph M. Sharkey, Box Hill, Victoria, Australia, assignors, by mesne assignments, to National Dairy Products Corporation, New York, N.Y., a corporation of Delaware
Filed Oct. 15, 1964, Ser. No. 403,993
Claims priority, application Australia, Aug. 14, 1964, 48,143/64
15 Claims. (Cl. 99—116)

ABSTRACT OF THE DISCLOSURE

Method and apparatus for conditioning cheese curd, in which curd granules are introduced into a first vessel, compressed to form a curd mass, and transferred to a second vessel in such a manner as to enable the curd mass to expand uniformly.

---

Figure 1:
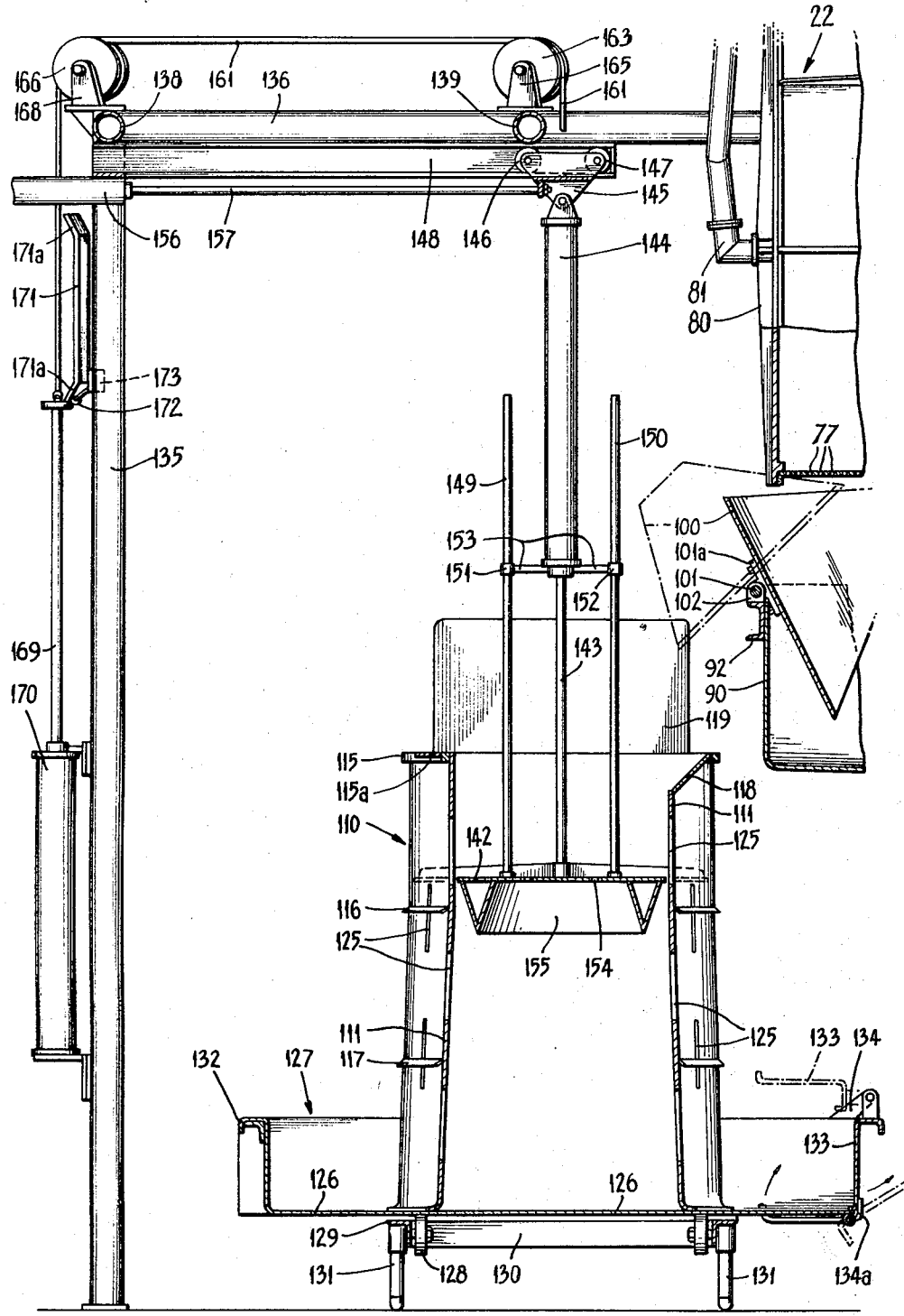

This invention relates to an improved method and apparatus for manufacturing cheese, and more particularly relates to method and apparatus for the conditioning of cheese curd for the manufacture of American cheese.

The term "American cheese," for the purposes of this invention is defined in the Department of Agriculture Handbook No. 54.

One known method for the manufacture of Cheddar cheese is carried out in accordance with the following steps: (1) A batch of milk is placed in a cheese vat and inoculated with a lactic acid starter. (2) After the desired degree of lactic acid development has been attained, rennet is added in order to set or coagulate the milk. (3) When the resulting curd has attained the proper degree of firmness, the curd is cut into cubes with curd knives. At cutting, the curd has an acidity of .10 to .13, expressed as percent lactic acid or its equivalent. (4) The curd is then agitated in the whey and heated to a temperature of about 100° F. to 105° F., the heating of the curd to the desired temperature preferably taking place over a period of about 30 minutes. (5) The curd is held at this temperature and agitation of the curd is continued until the acidity of the whey reaches about .13 to .16 at which time the heating is terminated and the whey is drained from the cheese vat. Usually, the temperature is maintained for about one hour. (6) The mass of curd is then formed or "ditched" to facilitate whey drainage.

The curd is then allowed to knit and drain, after which it is cut into blocks or slabs which are turned on the bottom of the vat. Just prior to cutting, the whey acidity is .17 to .19. After about one hour, the slabs are stacked, cut and restacked by hand during which time the acidity of the curd increases and further amounts of whey are expelled from the curd. The cutting, turning and stacking of the cheese curd in the cheese vat is known as "cheddaring." Cheddaring is usually continued for a period of about two hours until the acidity of the whey reaches about .50 and the desired knit and smoothness of curd is achieved. The cheese curd is then milled, i.e., cut into small pieces, and salted with an amount of salt to provide a total salt content, including the salt originally present in the milk, of from about 1.65 to 1.9 percent by weight of the curd. (7) The salted curd is then placed in hoops and pressed overnight. (8) The pressed curd is then wrapped and cured until the desired flavor characteristics are attained.

As will be seen by the foregoing, the cheddaring, milling and salting steps in the manufacture of Cheddar cheese are time consuming and result in high labor costs due to manual handling of the cheese curd. Further, the process steps are carried out in the cheese vat so that the vat can be used for only one or perhaps two batches of milk per day.

A known alternate for the cheddaring step in the manufacture of American cheese includes stirring the curd and, when such step is used, the cheese is said to be made by the stirred curd process. In the stirred curd process, the milk is set to form cheese curd, and the curd is cut and cooked substantially in accord with the described Cheddar process. Instead of cheddaring the cheese curd in the cheese vat and allowing the curd to knit, in the stirred curd process the mixture of cheese curd and whey is placed on a drain table and the whey partially drained from the curd. The curd is mechanically stirred to maintain it in granular form without matting, and is drained until the curd is dry enough for salting. The drain table is a shallow rectangular box which has a perforated bottom section through which the whey passes as it is expelled from the curd. However, the perforations are of a size which retain the cheese curd on the drain table. After the curd has been salted on the drain table, it is pressed, hooped and cured in accordance with standard procedures.

The stirred curd process has certain advantages in the making of cheese over the Cheddar process and provides a cheese that is substantially identical to the cheese obtained from the Cheddar process. However, it would be desirable to provide a process for the manufacture of American cheese which further facilitates the manufacture of such cheese.

It is a principal object of this invention to provide a method and apparatus for carrying out the conditioning of cheese curd with minimum manipulation of the curd, whereby cheese curd is produced having the desired texture, acidity and other properties of cheese curd prepared by a Cheddar process.

Another object of the invention is to provide an apparatus for the mechanical conditioning of cheese curd which provides a cheese curd having desired characteristics substantially identical to the characteristics of cheese curd prepared by a Cheddar process.

An additional object of the invention is to provide a method for the manufacture of American cheese.

In this specification, the term "curd granules" includes solid and semisolid particles or small pieces of curd from which substantially all or most of the whey has been drained or otherwise removed. The process of the present invention, in which the curd becomes knitted, is to be distinguished from the stirred curd procedure wherein the curd does not become knitted until after hooping of the curd.

According to one form of the invention, the method of conditioning cheese curd comprises placing curd granules in a first vessel or conditioning tower, compressing the curd granules in the conditioning tower to cause knitting of the curd granules into a curd mass, and thereafter causing the curd mass to flow and to stretch. The stretched curd mass should not rupture but should generally flow. Drainage of whey from the curd mass is effected during the compression of said mass.

The curd mass is preferably subjected to a controlled change of dimension or spreading while flowing from the lower end of the conditioning tower. The control substantially prevents rupture of the curd mass while permitting stretching or spreading of the curd mass. Thus, the curd mass flows from one conditioning tower having one dimension into a second vessel such as a forming tray or confining receptacle having another dimension. The change of dimension may be effected by progressively raising the conditioning tower relative to the forming tray thereneath which has a configuration different from that of the tower (or by progressively lowering the tray relative to the tower, or by both raising the tower and lowering the tray) in such a manner as to cause the curd mass to flow from the lower end of the conditioning tower and at the same time to slowly stretch the curd mass in desired manner and to a predetermined extent in the space between the lower end of the conditioning tower and the forming tray, the said space being increased at a controlled rate during the change of dimension of the curd to permit flow without rupture of the curd mass.

The curd granules are confined or held in the conditioning tower during the draining, knitting and compressing operation, and this may be effected by maintaining the forming tray or confining receptacle in contact with the lower end of the conditioning tower during such operation. The curd should be drained at points throughout the height of the conditioning tower so that drainage is not limited to the bottom of the conditioning tower.

Compression of the curd granules in the conditioning tower is preferably effected by a pressure plate which exerts downward pressure on the curd in the tower.

A vacuum may be applied to the curd granules in the conditioning tower prior to the compression of the curd granules.

The method of the invention may also include the step of applying heat and/or pressure to the curd mass, after its removal from the conditioning tower, to cause further stretching of the curd mass. The curd mass may be retained in the forming tray for a controlled period after heat and/or pressure have been applied thereto to effect further knitting and acid development. The application of heat and pressure may be effected by placing a heated pressure plate in contact with the upper surface of the curd mass in the forming tray, the curd mass being subjected to increasing deformation at a gradual controlled rate so as to spread or stretch without substantial rupture of the curd mass in the forming tray. Heating of the curd mass, particularly the top layer thereof, after its removal from the conditioning tower increases the plasticity of the said curd and enables further spreading or stretching of the curd mass without rupture.

When subjecting the curd granules to compression in the conditioning tower, it has been found desirable, in order to effect the required knitting of the curd and expulsion of whey therefrom, to subject the curd granules first to low pressure, preferably about 0.6 lb./sq. inch for a period of about three minutes, and second to higher pressures, preferably about 2.5 lbs./sq. inch, for a similar period.

As previously stated, the removal of the curd mass from the conditioning tower and the compression of the curd mass in the forming tray beneath the conditioning tower in order to cause stretching of the curd mass without causing rupture thereof are effected in a controlled manner. Preferably the removal of the curd mass from the conditioning tower is effected by raising the conditioning tower relative to the forming tray in accordance with a predetermined cycle, the curd mass being thereby caused to flow outwardly towards the boundaries of the forming tray, the cross-sectional area of the tray being greater than that of the conditioning tower. The cycle of lifting operations of the conditioning tower relative to the forming tray may comprise a relatively rapid initial lift, a slower intermediate lift and a relatively rapid final lift. Satisfactory results have been obtained by a lifting cycle which comprises raising the conditioning tower a distance of three inches in the first one-half minute, seventeen inches in the next four minutes, and the remaining fifteen inches in one minute. Other lifting cycles which include a rapid initial lift, an intermediate slow lift, and a rapid final lift are contemplated.

Apparatus for carrying out the described method of conditioning cheese curd, according to a form of the invention, comprises a conditioning tower into which curd granules are placed, means for compressing the curd granules in the conditioning tower to enhance knitting of the mass, means for removing the curd mass from the conditioning tower, and means for permitting stretching of the curd mass during or after its removal from the conditioning tower. The tower preferably is provided with spaced perforations for whey drainage.

More particularly, the apparatus may comprise a conditioning tower disposed above a forming tray, the cross-sectional area of the forming tray being greater than that of the conditioning tower, and means for effecting relative movement between the conditioning tower and the tray or receptacle so as to progressively increase the space therebetween.

The conditioning tower is preferably disposed vertically, and during compression of the curd is closed at its lower end by engagement with the floor or bottom surface of the forming tray. The compression of the curd within the conditioning tower may be effected by a pressure plate which fits within the upper end of the conditioning tower and is arranged to engage the upper surface of the curd in the tower and to exert downward pressure thereon, the degree and the duration of the period of the pressure so applied being controlled according to a predetermined cycle.

A feature of one form of the invention resides in providing a conditioning tower of a particular cross-sectional shape with respect to the cross-sectional shape of the forming tray whereby stretching of the curd mass from the lower end of the tower towards the side walls of the forming tray or receptacle during the change of dimension of the curd mass is effected in the desired manner.

When the forming tray has a rectangular cross-sectional shape the conditioning tower preferably has side walls which define a four pointed star-shaped cross section, and the side walls of the conditioning tower at each point of the star are inclined to one another to provide an interior angle of less than 90°, and preferably an angle between 50° and 60°. A suitable angle is 55°. Intermediate the star points, the side walls of the tower meet to form a recess. More particularly, the cross-sectional shape of the conditioning tower is such that when the conditioning tower is located centrally in the forming tray or receptacle, with the points of the star shaped conditioning tower aligned with the corners of the forming tray, the distance between a star point of the tower and the adjacent corner of the forming tray or receptacle is substantially equivalent to the distance between the center of the recess in the side walls of the tower and the center of the corresponding side walls of the forming tray or receptacle.

By utilizing a conditioning tower having a cross-sectional shape as above described, it has been found possible to ensure that the curd mass during its flow from the conditioning tower will stretch substantially uniformly within the forming tray or receptacle. It is apparent that if a forming tray having a different cross-section is selected, the conditioning tower may be correspondingly altered in shape in order to achieve the desired result, for example, both the conditioning tower and the forming tray may have a circular cross-section.

It has been found that the provision of a star-shaped conditioning tower of the type described in combination with the rectangular shaped forming tray will not interfere with uniform knitting of the curd during flow of the curd mass from the conditioning tower.

If the forming tray or receptacle is of square-shape in cross-section, which is preferred, the curd mass after removal from the star-shaped conditioning tower constructed according to this invention is block shape.

The conditioning tower may be slightly tapered, that is, its cross-sectional area may increase slightly from at or near its upper end to its lower end to facilitate downward movement of the curd in the conditioning tower during compression and also during the removal of the curd mass from the lower end of the tower. However, this tapering is not particularly significant in providing the results of this invention. Means are provided in the conditioning tower for removing whey from the curd during compression thereof in the conditioning tower, and this means may comprise a series of vertical slots or slits formed in the side walls of the conditioning tower, the said slots or slits being spaced laterally and vertically from one another substantially throughout the height of the tower.

The pressure plate which is employed to apply pressure to the curd in the conditioning tower is preferably provided with a ring or like member on its under surface, which may have a V-shaped cross section, the said ring being caused to engage the upper surface of the curd while pressure is being applied thereto. The V-shaped ring is found to improve the flow of the curd in the immediate vicinity of the pressure plate.

An annular recess having a V-shaped cross section is formed in the upper surface of the curd mass by the V-shaped ring, and it is found that this ensures that the upper surface of the curd mass is able to flow or stretch to the desired extent during the change of dimension of the curd mass without effecting undesired stretching of the curd mass or rupture of the curd surface.

Other objects and features of the invention will be apparent from the ensuing description of the particular form of the invention which is illustrated in the accompanying drawings, in which:

FIGURE 1 is a fragmentary side elevation partially in section, showing a conditioning tower and associated mechanism, FIGURE 2 is a fragmentary view in plan of the conditioning tower and associated mechanism shown in FIGURE 1, FIGURES 3, 4, 5 and 6 are views in side elevation, partly in section, showing successive stages in the removal of the curd mass from the lower end of the conditioning tower, FIGURE 7 is a perspective view of the conditioning tower and pressure plate, FIGURE 8 is a perspective view showing the forming tray and the curd mass therein after removal of the latter from the conditioning tower, and FIGURE 9 is a view in section and elevation taken on the line 9—9 of FIGURE 2.

Referring to the drawings, there is shown a preferred embodiment of the present invention wherein a conditioning tower 110 is provided for conditioning cheese curd. The conditioning tower 110 is formed of sheet metal such as stainless steel, and is arranged vertically, the upper and lower ends of the tower 110 being open.

The conditioning tower 110 is of star-shape in plan (FIGURES 2 and 10). The tower 110 is formed of side walls 111 each of which is of shallow V-shape when viewed in plan, that is, each side wall 111 is formed of two sections 112 and 113 (FIGURE 7) of equal size which are secured together or formed integrally with one another along a vertical line which comprises the center of the side wall 111. The section 112 of one side wall and the section 113 of the adjacent wall are disposed at an acute angle to one another, preferably at an angle of about 55°, and are joined together or formed integrally with one another by means of a curved section 114 to form the corner of the fusing tower. The corners 114 and the bottom edge of the tower 110 are curved to prevent "dragging" or "catching" of the curd. A strengthening rib 115 is provided around the upper end of the tower 110 and strengthening ribs 116 and 117 are provided at intermediate points on the outer surface of the tower, the said ribs 115, 116 and 117 being suitably secured to the outer surfaces of the walls 111. Strengthening flanges 115a are secured to the rib 115 on three sides of the tower 110 and on the fourth side of the tower the side wall 111 is provided with an inclined section 118 at its upper end, the upper edge of which engages the rib 115.

Guide plates 119 and 120 are secured to and extend upwardly from the upper ends of the side walls 111 on opposite sides of the fusing tower 110. The lower edge of each guide plate 119, 120 is shaped to engage the V-shaped upper edge of the wall 111, and the upper edges of the guide plates 119, 120 are shaped to incline outwardly as shown in FIGURES 2 and 7.

The upper portion of each side wall 111 between the ribs 115 and 116 is disposed substantially vertically and the lower portions of the side walls 111 between the rib 116 and the lower end of the tower are shaped to incline outwardly and downwardly at a small angle as shown in FIGURE 1.

Slots 125 (preferably disposed vertically) are formed in the side walls 111 of the tower 110 and these slots 125 are spaced vertically from one another and are also spaced laterally around the walls of the tower. Preferably two vertical slots 125 are provided in each wall section 112, 113 and three vertical slots are provided on the line of division between the wall sections 112, 113, but it will be understood that the slots 125 may be otherwise arranged if desired.

The slots 125 permit draining of excess or surplus whey from the curd outwardly through said slots.

The conditioning tower 110 normally rests at its lower end on the floor 126 of a forming or cheddaring tray 127 which in turn is carried on the rollers 128 of a roller conveyor 128a (FIGURE 9). The roller conveyor comprises longitudinal frame members 129, transverse frame members 130 and uprights 131. The tray 127 (FIGURE 2) is of square shape in plan, is provided with a flanged upper edge 132 for strengthening purposes, and is of substantially larger cross sectional area than that of the fusing tower 110. Preferably the width of the tray 127 is at least twice that of the fusing tower 110. A side wall 133 of the tray 127 is hinged to brackets 134 on the tray, and the hinged side wall 133 is normally held closed by a catch 134a. Opening of the side wall 133 is effected at a later stage when removal of the curd mass from the tray is desired.

The star shape in plan of the conditioning tower 110 is such that the distance between a corner 114 of the said tower and the corresponding corner of the tray 127 is approximately equal to the distance between the center of a side wall 111 of the tower 110, and the mid-point of the corresponding side wall of the tray 127. This arrangement ensures that the curd which is removed from the lower end of the tower 110 as hereinafter described is caused to flow laterally through a substantially uniform distance to reach the side walls of the square tray 127, so that contact of the curd mass with the periphery of the square tray takes place at substantially the same time over the whole of said periphery.

Curd granules are delivered to the upper end of the tower 110 from a rotatable cylindrical trommel 22 (see FIGURES 1 and 2) in which the majority of the whey is separated from the curd granules, the said whey being caused to pass outwardly from the trommel 22 through slots 77 which are formed in the periphery of the trommel 22 over approximately one-third of its surface. The construction and operation of the trommel 22 is more fully described in copending application Ser. No. 404,003, now Patent No. 3,292,259, filed Oct. 15, 1964. The discharge end of the trommel 22 is closed by a door 80 which is secured at its center to a door actuating frame 81. The frame 81 is operated by an air cylinder 84 which is pivoted to a transverse member 28 of the trommel frame, the opening and closing movements of the door 80 being effected in accordance with a predetermined cycle.

The trommel frame 21 is tiltable by means of a tilting mechanism (not shown) about pivot pins 33 which are secured to extensions 31 on the trommel frame 21, the pivot pins 33 being rotatable in bearings 34 mounted on brackets 35 secured to the uprights 23 of the main frame.

A guide chute 100 is provided to guide the curd granules from the discharge end of the trommel 22 into the upper end of the tower 110 at the appropriate time. The discharge chute 100 is pivotally mounted so that it can be moved from the inoperative position shown in full lines in FIGURES 1 and 2 to the discharge position shown in dotted lines in FIGURE 1.

A shaft 101 is secured to a bracket 101a attached to the wall of the chute 100 and the said pivot pin 101 is rotatably mounted in bearings 102 which are mounted on a channel shaped flange 92 which is provided on the tray 90 into which the whey is drained from the trommel 22.

The outer end of the shaft 101 is secured to an arm 103 which is pivoted to the piston 104 of an air cylinder 105, the end of which is pivoted to a bracket 106 secured to one of the uprights 23 of the main frame.

The air cylinder 105 serves to move the chute 100 from the inoperative position shown in full lines in FIGURES 1 and 2 to the operative position shown in dotted lines in FIGURE 1. In the inoperative position the chute 100 permits raising and lowering of the tower 110 while in its operative position it permits the curd granules to be discharged from the discharge end of the trommel 22 (which during discharge is being rotated in the tilted position) into the upper end of the tower 110, the pressure plate 142 being removed from the tower 110 during the filling operation.

A frame is provided on which is mounted the mechanism for raising and lowering the tower 110 and the mechanism for compressing the curd in the tower 110. This frame comprises uprights 135, upper longitudinal members 136, 137, and upper transverse members 138, 139 which connect the longitudinal members 136, 137.

A pressure plate 142 is secured to the lower end of a piston 143 mounted in an air cylinder 144, the upper end of which is pivoted to a carriage 145 having rollers 146, 147 which travel horizontally in guide tracks 148 which are secured to the transverse frame members 138, 139. An air cylinder 156 having a piston 157 which is connected to the carriage 145 is provided for moving the carriage 145, and with it the pressure plate 142, between the inoperative position shown in FIGURES 2 to 6 and the operative position shown in FIGURE 1. In the operative position the pressure plate 142 is disposed in vertical alignment with the tower 110.

The pressure plate 142 is maintained in a horizontal position during its vertical movement, by guide rods 149, 150 which are vertically slidable in bushes 151, 152 secured to the ends of arms 153 which extend laterally from and are secured to the lower end of the air cylinder 144, the lower ends of the guide rods 149, 150 being secured to the pressure plate 142.

Apertures 154 are formed in the pressure plate 142 through which air and whey may escape during the downward movement of the pressure plate.

Means (not shown) are provided for connecting a source of vacuum to an aperture in the pressure plate 142, so that vaccum may be applied to the curd, before the pressure is applied and the pressure plate 142 is lowered, in order to remove air pockets from the curd mass. This ensures that the curd mass is of even texture and is substantially free from air pockets after removal from the tower 110.

A ring-shaped member 155 which is of V-shape in cross-section is secured to the lower surface of the pressure plate 142, and is caused to make an annular V-shape indentation 177 in the curd mass 175 when pressure is applied to said mass by the pressure plate 142 (FIGURE 8).

The pressure plate is of the same shape in plan as the tower 110 so as to fit neatly therewithin.

The conditioning tower 110 is raised and lowered by means of cables 160, 161, the ends of which are secured to brackets 162 (FIG. 7) secured to the side walls 111 of the tower 110. Each bracket 162 is provided with an aperture 163a disposed outwardly of the adjacent slot 125 to permit whey to drain outwardly through said slot. The cables 160, 161 pass upwardly from the brackets 162 and around pulleys 163 which are rotatably mounted on brackets 164, 165 secured to the transverse member 139. The cables 160, 161 then pass around pulleys 166, 167 mounted on the bracket 168 which is supported on and secured to the longitudinal frame member 136 and transverse frame member 138 at one corner of the supporting frame.

The cables 160, 161 after passing around the pulleys 166, 167 extend downwardly and are connected to the upper end of a piston 169 of an air cylinder 170 which is secured to the upright 135 of the supporting frame.

A cam 171 is secured at its lower end to the upper end of the piston 169 and is adapted to engage an arm 172 of a micro switch 173 mounted on the upright 135. The cam 171 is shaped so as to actuate the arm 172 of the micro switch 173 in order to effect raising of the tower 110 according to a predetermined cycle.

The micro switch 173 controls a spool valve (not shown) which regulates the flow of exhaust air from the air cylinder 170. When the arm 172 engages the inclined portions 171a of the cam 171, the flow of air to the air cylinder 170 is unrestricted and the tower 110 is raised at the maximum rate. When the arm 172 engages the central part of the cam 171, the spool valve which restricts the flow of air to the air cylinder 170 is actuated and the rate of lifting of the tower 110 is reduced.

The raising of the tower 110 is controlled by the cam 171 and micro switch 173 so as to effect a slow lateral spreading of the curd towards the side walls of the tray 127 as the curd is removed from the lower end of the tower 110. The lifting cycle of the tower 110 preferably comprises raising the tower three inches in the first half minute, seventeen inches in the next four minutes and the remaining fifteen inches in the next one minute. If the raising of the tower 110 is carried out too quickly, the curd mass tends to disintegrate, whereas if it is done too slowly there is a tendency for the curd to stick to the walls of the tower with consequent tearing of the curd.

The manner in which lateral spreading of the curd 175 is effected is shown in FIGURES 3 to 6 which represent successive stages in the lifting cycle. As the tower 110 is raised, the curd is progressively removed from the lower end of the tower and at the same time spreads laterally outwards towards the side walls of the tray 127 in the manner indicated in these drawings.

When the tower 110 has been fully raised as indicated in FIGURE 6 the lower end of said tower is free from the upper surface of the curd 175 and the mass of curd has spread into the approximately pyramidal shape shown in FIGURES 6 and 8. The lower portion of the curd mass is caused to flow laterally towards the side walls of the tray 127 and to contact said walls substantially uniformly therealong. This is due to the fact that the radial distance between the side walls of the tower 110 and the side walls of the tray 127 is substantially uniform at all points, so that the curd mass is required to flow laterally through substantially the same distance in all directions before it contacts the side walls of the tray 127, and consequently the curd mass contacts the side walls or boundaries of the tray at substantially the same time and the subsequent "build-up" of curd is substantially uniform along the entire periphery of the tray. The plan view of the lower and outermost portions of the curd mass approximates fairly closely the square shape of the tray 127 when spreading of the curd in the tray has progressed to, for example, the stage shown in FIGURE 8.

The recess 177 which is formed in the upper surface of the curd by the V-shaped ring 155 ensures that the curd will spread evenly so as to substantially fill the tray 127 without causing uneven deformation or disintegration of the upper surface of the curd mass.

After the tower 110 has been fully raised from the curd mass 175 as shown in FIGURE 6, the tray 127 containing the curd mass is moved laterally on the rollers 128 to the position indicated by the numeral 178 in FIGURE 2, at which point the tray 127 is located beneath a heated pressure plate 180 (see FIGURES 2 and 9). The heated pressure plate 180 is suspended by chains 181 which are attached at their lower ends to rings 182 secured to the pressure plate 180 and at their upper ends to a hook 183 attached to a cable 184. When the cable 184 is lowered the pressure plate 180, which is of substantial weight (preferably about 2,500 pounds) and is electrically heated and thermostatically maintained at a predetermined temperature (preferably about 106° F.), contacts the upper surface of the curd mass 175 in the tray 127 and encourages the further lateral flow of curd to the tray boundaries. The pressure plate 180 is lowered intermittently and is preferably lowered about four inches and held in this position for one minute, and this cycle is repeated until the pressure plate is in its lowest position. The curd mass 175 has then been caused to spread laterally in a controlled manner so as to substantially fill the tray 127, and the pressure plate 180 is then raised and the filled tray is moved to the next station on the roller conveyor.

Each tray 127 is moved automatically through a plurality of stations (for example, seven stations) on the roller conveyor over a period of two hours or longer. During this period further fibre development or cheddaring of the cheese curd takes place and in addition the acidity of the curd develops to the required degree.

After the curd has passed through the various stations and cheddaring has been completed, the curd is subjected to subdivision and is then salted and hooped or packed by mechanism which it is not necessary to describe or illustrate in this specification.

In a process for manufacturing American cheese in accordance with the method of the present invention, and utilizing the apparatus of the present invention, a batch of milk is inoculated with a suitable starter culture and rennet is added to set or coagulate the milk. The curd is then cut and cooked in accordance with conventional procedures for the manufacture of American cheese. When the acidity, expressed as percent lactic acid or its equivalent, of the whey reaches between about 0.13 and about 0.16 percent, the mixture of cheese curd and whey is introduced into a rotating trommel and the whey is separated from the cheese curd. The cheese curd granules are then introduced into a conditioning tower.

The cheese curd granules are compressed in the conditioning tower by means of a pressure plate which is applied to the upper surface of the curd granules. An initial pressure of about 0.6 pound per square inch is applied to the curd granules for about three minutes and thereafter a higher pressure of about 2.5 pounds per square inch is applied for an additional three minutes. During compression of the cheese curd a further amount of whey is expelled from the curd and passes out of the conditioning tower through the slots therein and the curd granules are caused to knit into a curd mass. The curd mass is then delivered from the conditioning tower into a forming tray or other receptacle in a manner so as to impart a controlled change of dimension to the curd mass without causing substantial rupture of the curd mass. At the time the curd mass is transferred from the conditioning tower into the forming tray the acidity of the whey expelled from the curd is between about 0.20 and about 0.25. The curd mass is then further compressed in the forming tray to effect a further controlled change of direction of the curd mass without substantial rupture thereof. The curd mass is held for a period of time to allow the acidity of the whey expelled from the curd to rise to between about 0.40 and about 0.65. When the acidity of the whey reaches this level the curd mass is cut into strips and milled in a curd mill. The milled curd is then salted with a usual amount of salt and pressed into hoops lines with cheesecloth and stored over night. The cheese is then wrapped and cured for a sufficient period of time to develop the characteristic flavor of American cheese.

EXAMPLE 18,000 pounds of milk was introduced into a cheese vat and inoculated with 180 pounds of a lactic acid starter culture. After a period of one hour ripening time, 50 ounces of rennet was added to the milk to coagulate the milk in the usual 30 minutes. When the curd was cut with curd knives the whey had an acidity of 0.10. The curd was agitated in the whey and cooked at a temperature of 100° F. until the acidity of the whey reached 0.155 percent, at which time the mixture of cheese curd and whey was introduced into a rotating trommel and the whey was separated from the cheese curd. The cheese curd granules were then introduced into a star-shaped conditioning tower and were compressed by means of a pressure plate applied to the top surface of the cheese curd granules in the conditioning tower in order to effect knitting of the cheese curd into a curd mass. An initial pressure of 0.6 pound per square inch was applied to the cheese curd granules for a period of three minutes followed by application of pressure of 2.5 pounds per square inch for an additional three minutes.

The curd mass was then delivered from the star-shaped conditioning tower into a rectangular forming tray positioned beneath the conditioning tower. The deliver of the curd mass from the conditioning tower into the forming tray was effected by raising the conditioning tower with respect to the forming tray a distance of three inches in the first one-half minute, seventeen inches in the next four minutes, and fifteen inches in the next one minute, the lifting cycle being such that the curd mass underwent a controlled change of dimension without substantial rupture of the curd mass. The acidity of the whey expelled from the curd mass after delivery of the curd mass into the forming tray was 0.23 percent.

The curd mass was then further compressed by application of a pressure plate to the upper surface thereof in the forming tray. The pressure plate weighed 2,500 pounds and was lowered intermittently until the curd mass was caused to fill the forming tray, the lowering of the pressure plate being controlled to avoid substantial rupture of the curd mass.

The curd mass was held in the forming tray until the acidity of the whey expelled therefrom reached 0.48 at which time the curd mass was cut into strips and milled in a curd mill. The milled curd was then salted, hooped and pressed, and cured in accordance with conventional procedures.

An American cheese was obtained which had a characteristic Cheddar cheese flavor and which was considered to be identical to Cheddar cheese prepared in accordance with a conventional cheddaring process.

It can be seen that a method and apparatus for manufacturing an American cheese has been provided whereby American cheese may be manufactured in a convenient manner on a large-scale commercial basis without manual handling of the cheese curd.

Although certain of the features of the invention have been set forth with particularity in order to describe the invention, various alternatives within the skill of the art are contemplated.

Various of the features of the invention are set forth in the following claims:

What is claimed is:

1. A method of conditioning cheese curd comprising introducing curd granules into a first vessel having a discharge opening defining a given cross sectional area, compressing the curd granules in the first vessel to cause knitting of the curd granules into a curd mass, and transferring the curd mass into a second vessel having side walls defining a cross sectional area significantly greater than that of said discharge opening of the first vessel in such a manner as to permit essentially uniform lateral expansion of the curd mass outwardly in all directions from its center upon entering said second vessel.

2. A method in accordance with claim 1, wherein the lateral expansion is initially accomplished by unassisted gravity flow.

3. A method in accordance with claim 1, wherein the curd mass is introduced into the second vessel gradually over a predetermined period of time so as to achieve a predetermined rate of lateral expansion.

4. A method in accordance with claim 2, wherein a pressure plate is placed upon the upper surface of the curd mass in the second vessel after a predetermined degree of unassisted gravity flow.

5. A method in accordance with claim 4, wherein the pressure plate is maintained at a predetermined temperature above ambient when in contact with the curd mass.

6. A method of conditioning cheese curd, which method comprises providing an upright conditioning tower having a closable discharge opening at its lower end, supporting the conditioning tower with its lower end adjacent the bottom wall of a forming tray, the bottom wall having a significantly larger area than that defined by the discharge opening, introducing curd granules into the conditioning tower and compressing them therein to knit them into a flowable mass while maintaining the discharge opening in a closed condition, and opening said discharge opening and allowing the curd mass to flow gradually therethrough into the forming tray while undergoing a gradual uniform change in lateral dimension in all directions.

7. A method of conditioning cheese curd, which method comprises introducing curd granules into an upright conditioning tower having a discharge opening at its lower end and supported on the bottom wall of a forming tray with the discharge opening arranged generally centrally of the bottom wall and with the bottom wall serving as a closure for the opening, the bottom wall of the forming tray defining a larger area than the opening of the conditioning tower, compressing the curd granules in the conditioning tower to facilitate draining of whey from the curd granules and to knit the curd granules into a flowable curd mass, and progressively effecting relative movement between the conditioning tower and the forming tray so as to separate the tower and tray and open the discharge opening, thereby permitting the curd mass to flow from the conditioning tower into the forming tray while undergoing a gradual uniform change in lateral dimension in all directions.

8. A method in accordance with claim 7, wherein the relative movement between the tower and forming tray is effected by raising the conditioning tower relative to the forming tray.

9. An apparatus for conditioning cheese curd comprising an upright conditioning tower having a discharge opening at its lower end, a forming tray including a bottom wall defining a larger area than said discharge opening, said conditioning tower being supported on said bottom wall of said forming tray with said discharge opening arranged generally centrally of said bottom wall and with the bottom wall serving as a closure for said opening, means for compressing the curd granules in said conditioning tower to facilitate draining of whey from the curd granules and to knit the curd granules into a flowable curd mass, and means for progressively effecting gradual relative movement between said conditioning tower and said forming tray so as to separate said tower and tray and open the discharge opening, thereby permitting the curd mass to flow from the conditioning tower into the forming tray while undergoing a gradual change in lateral dimension.

10. An apparatus in accordance with claim 9, wherein a pressure plate is provided adapted to be placed upon the curd mass in the forming tray, said pressure plate being of sufficient weight to induce a further gradual lateral flow of the curd mass.

11. An apparatus in accordance with claim 9, wherein means are provided for maintaining said pressure plate at a predetermined temperature when in engagement with the curd mass.

12. An apparatus in accordance with claim 8, wherein said means for compressing the curd within said tower comprises a piston having a face for contacting the curd, said face being provided with an annular projection concentric with the face of the piston.

13. An apparatus in accordance with claim 12, wherein said annular projection is defined by an inner and an outer wall surface extending from the face of the piston in converging relation to each other.

14. An apparatus in accordance with claim 9, wherein the configuration of said discharge opening and the bottom wall of said forming tray are such that the portions of said conditioning tower defining said discharge opening are essentially equidistant from the side edges of the bottom wall of said forming tray when said conditioning tower is positioned with said discharge opening located generally centrally of said bottom wall of said forming tray, thereby assuring an essentially uniform change in lateral dimension of the curd mass.

15. An apparatus in accordance with claim 14, wherein said bottom wall of said forming tray is generally of square configuration, and wherein said discharge opening has generally the shape of a four-pointed star, with the furthest indentation between adjacent points of the star being spaced from the closest side edge of the bottom wall of said forming tray a distance equal to the distance between a point of the star and a corner of the bottom wall of the forming tray when the discharge opening is positioned centrally of the bottom wall of the forming tray.

References Cited

UNITED STATES PATENTS 3,140,185    7/1964    Pinckney _____ 99—116

FOREIGN PATENTS 799,121    7/1958    Great Britain.

ALVIN E. TANENHOLTZ, *Primary Examiner.*

D. M. NAFF, *Assistant Examiner.*